(12) United States Patent
Aigner et al.

(10) Patent No.: US 10,632,398 B2
(45) Date of Patent: Apr. 28, 2020

(54) PURIFICATION OF CHLOROSILANES BY MEANS OF DISTILLATION AND ADSORPTION

(71) Applicant: Wacker Chemie AG, Munich (DE)

(72) Inventors: Maximilian Aigner, Burghausen (DE); Uwe Paetzold, Burghausen (DE); Jan Prochaska, Mehring (DE)

(73) Assignee: WACKER CHEMIE AG, Munich (DE)

(*) Notice: Subject to any disclaimer, the term of this patent is extended or adjusted under 35 U.S.C. 154(b) by 0 days.

(21) Appl. No.: 16/354,278

(22) Filed: Mar. 15, 2019

(65) Prior Publication Data

US 2019/0209944 A1    Jul. 11, 2019

Related U.S. Application Data

(62) Division of application No. 15/517,080, filed as application No. PCT/EP2015/073195 on Oct. 7, 2015, now Pat. No. 10,300,401.

(30) Foreign Application Priority Data

Oct. 9, 2014  (DE) .......................... 10 2014 220 539

(51) Int. Cl.
  *B01D 3/14*    (2006.01)
  *C01B 33/107*    (2006.01)
(52) U.S. Cl.
  CPC ............. *B01D 3/141* (2013.01); *B01D 3/143* (2013.01); *C01B 33/10778* (2013.01)

(58) Field of Classification Search
  CPC .... B01D 3/141; B01D 3/143; C01B 33/10778
  See application file for complete search history.

(56) References Cited

U.S. PATENT DOCUMENTS

| | | | |
|---|---|---|---|
| 3,867,263 A | | 2/1975 | Wall, Jr. |
| 4,511,437 A | * | 4/1985 | Heck ......................... B01D 1/26 203/19 |
| 4,713,230 A | | 12/1987 | Doornbos |
| 5,723,644 A | * | 3/1998 | Tzou ....................... C07F 7/128 423/342 |
| 6,053,484 A | * | 4/2000 | Fan .......................... B01D 3/20 261/114.1 |

(Continued)

FOREIGN PATENT DOCUMENTS

| | | |
|---|---|---|
| CA | 1217449 A | 2/1987 |
| DE | 10 2008 002 537 A1 | 12/2009 |

(Continued)

OTHER PUBLICATIONS

EP2266674A1_ENG (Espacenet machine translation of Kaibel) (Year: 2010).*

(Continued)

*Primary Examiner* — Youngsul Jeong
*Assistant Examiner* — Gabriel E Gitman
(74) *Attorney, Agent, or Firm* — Brooks Kushman P.C.

(57) ABSTRACT

Separation of chlorosilane mixtures containing boron, arsenic, and/or phosphorus impurities is facilitated by a distillative separation using at least one divided column, with recycle streams to a first column being passed through an external absorbent for the impurities.

4 Claims, 5 Drawing Sheets

(56) References Cited

U.S. PATENT DOCUMENTS

| | | |
|---|---|---|
| 2003/0181772 A1 | 9/2003 | Meyer |
| 2007/0281052 A1* | 12/2007 | Goodwin ............... B01D 3/001 426/11 |
| 2009/0060819 A1 | 3/2009 | Bill, Jr. et al. |
| 2010/0266489 A1 | 10/2010 | Rauleder |
| 2010/0320072 A1 | 12/2010 | Schwarz |
| 2011/0150739 A1 | 6/2011 | Seliger et al. |
| 2011/0184205 A1 | 7/2011 | Rauleder et al. |
| 2012/0085126 A1 | 4/2012 | Gupta |
| 2012/0193214 A1 | 8/2012 | Paetzold et al. |
| 2013/0121907 A1 | 5/2013 | Hazeltine et al. |
| 2014/0014493 A1 | 1/2014 | Ryan |
| 2014/0158521 A1 | 6/2014 | Ablin et al. |

FOREIGN PATENT DOCUMENTS

| | | | |
|---|---|---|---|
| EP | 0141356 A2 | 5/1985 | |
| EP | 1 513 791 B1 | 3/2005 | |
| EP | 2 266 674 A1 | 12/2010 | |
| EP | 2266674 A1 * | 12/2010 | ............... B01D 3/14 |
| JP | 2014-097474 A | 5/2014 | |
| TW | 201332894 A1 | 8/2013 | |
| WO | 2016036762 A1 | 3/2016 | |
| WO | 2016/055549 A2 | 4/2016 | |

OTHER PUBLICATIONS

EP0141356A2_ENG (Espacenet translation of Lindner) (Year: 1985).
JPA_2014097474_ENG (J Pat Plat Translation of Tachikawa) (Year: 2014).
DE102008002637A1 ENG; Seliger et al., Dec. 2009 (Espacenet translationof foreign reference).

* cited by examiner

FIG. 5

PURIFICATION OF CHLOROSILANES BY MEANS OF DISTILLATION AND ADSORPTION

CROSS REFERENCE TO RELATED APPLICATIONS

This application is a division of U.S. application Ser. No. 15/517,080 filed Apr. 5, 2017, now pending, which is the U.S. National Phase of PCT Appln. No. PCT/EP2015/073195 filed Oct. 7, 2015, which claims priority to German Application No. 10 2014 220 539.5 filed Oct. 9, 2014, the disclosures of which are incorporated in their entirety by reference herein.

BACKGROUND OF THE INVENTION

1. Field of the Invention

The invention relates to processes and apparatuses for purifying chlorosilanes by distillation and adsorption.

2. Description of the Related Art

In particular, the invention relates to a process for separating a multicomponent mixture comprising chlorosilanes into its components while simultaneously depleting the level of impurities (boron, phosphorus, arsenic) in the chlorosilane mixtures.

Chlorosilanes such as trichlorosilane (TCS) are used for depositing polycrystalline silicon.

TCS is primarily produced by three different processes:
A) $Si + 3\ HCl \rightarrow SiHCl_3 + H_2 +$ byproducts (hydrochlorination of metallurgical silicon)
B) $Si + 3\ SiCl_4 + 2H_2 \rightarrow 4SiHCl_3 +$ byproducts (reaction of metallurgical silicon with silicon tetrachloride/STC and hydrogen)
C) $SiCl_4 + H_2 \rightarrow SiHCl_3 + HCl +$ byproducts (hydrogenation of silicon tetrachloride/STC)

Byproducts generated include, inter alia, dichlorosilane (DCS).

It is preferable when a mixture of chlorosilanes comprising TCS, STC, DCS and traces of further impurities (methylchlorosilanes, hydrocarbons, high boilers) is concerned.

High-purity trichlorosilane is obtained by carrying out a subsequent distillation in each case. An essential object of the distillation is the removal of boron-, phosphorus- and arsenic-containing compounds since said compounds are unwanted p-/n-dopants in the deposited silicon. In respect of these impurities the purity requirements for trichlorosilane employed in deposition are in the range of just a few ppta. Distillative processes are customary in chemical engineering to thermally separate mixtures of different relative volatility and/or mutually soluble substances.

Various process versions are commonly used for continuous distillative resolution of multisubstance mixtures.

In the simplest case a feed mixture composed of a low-boiling fraction and a high-boiling fraction is resolved into its two fractions, a low-boiling tops fraction and a high-boiling bottoms fraction. Here, the mixture to be separated is introduced between the bottom and the top of the distillation column. The feed divides the column into a rectifying section and a stripping section. The high-boiling fraction is withdrawn from the column in the bottoms. A portion of the concentrate is evaporated by a heating means (e.g. a natural circulation evaporator) incorporated in the bottom region. The low boiler ascends the column as vapor, is withdrawn from the column at the top of said column and is liquefied in a condenser. A portion of the condensate is recycled into the column again and runs downward in countercurrent to the ascending vapors (reflux).

However, the fractionation into more than two fractions of feed mixtures composed of a multicomponent mixture (A, B, C) then requires the use of a plurality of conventional distillation columns. There are several options to achieve this.

For the a-path the low boiler A is removed as a tops product in a first column. The bottoms fraction is a mixture of middle boiler B and high boiler C which is fractionated in a downstream column into the two pure substances B and C.

For material coupling with preseparation (a/c-path) the separation in the first column is performed such that the tops product comprises no high boiler C and the bottoms product comprises no low boiler A. The separation effected is thus that of the low boiler A and the high boiler C. The middle boiler B is present both in the tops fraction and in the bottoms fraction. Both fractions AB and BC are resolved, each in a separate downstream column, into the pure products A, B, and C. This version thus requires three separation steps.

For the c-path C is removed in the first column as pure bottoms product and mixture AB is transferred to the second column as tops product, typically in vaporous form.

It is generally the case that for fractionation of a three-component mixture the choice of a suitable path (a-path, c-path, a/c-path) depends on the composition of the input.

For high contents of low boiler A the a-path is preferred. By contrast the c-path is preferred for high contents of high boiler C.

When the middle boiler proportion B is high it is preferable to choose the a/c-path. For material coupling with a precolumn both columns are materially coupled (thus two-fold material coupling; so-called Petlyuk setup).

US 20120193214 A1 discloses a process for distillative purification of chlorosilanes which comprises providing a boron-containing mixture of chlorosilanes comprising TCS, DCS and STC and purifying the mixture of chlorosilanes by distillation in a plurality of distillation columns, wherein low-boiling boron compounds are tapped off from the distillation columns via tops streams comprising boron-enriched DCS and relatively high-boiling boron compounds are tapped off from the distillation columns via a boron-enriched bottoms stream comprising high boilers.

In addition to purely distillative processes it is also known to employ adsorbers.

The adsorber can fulfill various functions. Trace compounds may be retained from the trichlorosilane by adsorption mechanisms. This is an effective method of removal especially for polar molecules. The adsorbent may further be conditioned in order that a chemical reaction to convert these compounds begins on its surface. For instance deliberate hydrolysis on water-conditioned adsorber surfaces is a known method of generating boron-oxygen compounds that are markedly easier to remove in downstream distillation steps, see U.S. Pat. No. 4,713,230 A for example.

US 20110184205 A1 describes a process for treating a composition comprising at least one silicon compound and at least one extraneous metal and/or an extraneous metal-comprising compound, wherein the composition is contacted with at least one adsorption medium and/or at least one first filter in a first step and optionally contacted with at least one filter in a further step to obtain a composition having a reduced content of the extraneous metal and/or the extraneous metal-comprising compound.

Here, the boron content in chlorosilanes is reduced by contacting with water-free adsorber media (activated carbon, silicates such as silica gel, zeolites, organic resins). However, very large amounts of adsorber medium (120 g/250 ml of TCS) are required to achieve the desired purification objective. This makes the process uneconomical, especially as a continuous process is hardly possible, which is economically disadvantageous in the production of semiconductor-quality chlorosilanes. The use of adsorbers moreover necessitates further apparatus complexity (such as filtration) and brings with it the risk of introducing other impurities in the semiconductor-grade product.

US 20130121907 A1 discloses a process for removing at least one boron-containing impurity from a mixture comprising trichlorosilane to afford a purified product comprising trichlorosilane. This comprises partially removing the boron-containing impurity from the mixture to obtain a partially purified mixture comprising trichlorosilane. This partially purified mixture is supplied to a column through a side feed port. Discharged from the column are
a) a tops product comprising a boron-containing impurity
b) a bottoms product comprising a boron-containing impurity
c) and a purified mixture comprising trichlorosilane.

The partial removal of the boron-containing impurity may comprise supplying the mixture to a distillation column, discharging a tops product comprising boron-containing impurities and withdrawing a partially purified mixture as bottoms product. This bottoms product may be passed through an adsorber, for example a silica-gel bed, before it is supplied to the second column.

Despite a combination of adsorbers and distillation columns the distillation steps in the production of semiconductor-quality trichlorosilane still have enormous energy requirements. One attractive option for reducing energy requirements is offered by dividing wall column technology. This technology is based on the principle of material coupling and allows for a reduction in energy requirements of up to 50%. Since this process takes on the separation task of two apparatuses it is thus also possible to economize on capital expenditure.

Conventional dividing wall columns have a vertical dividing wall disposed in the column longitudinal direction which prevents transverse mixing of liquid and vapor streams in subregions of the column. This column thus comprises at least one vertical dividing wall which runs along part of the column height and divides the cross section into at least two segments to the left and right of the dividing wall.

It is thus possible to resolve, for example, a three component mixture into its three pure constituents in a single column which would normally require two conventional columns.

The dividing wall disposed in the column longitudinal direction separates the column interior into a feed section, a withdrawal section, an upper common column section (rectifying section) and a lower common column section (stripping section).

However combining the dividing wall column with the use of adsorbers known hitherto has proven costly and inconvenient to implement. The material coupling in the dividing wall column has the result that two separation tasks are performed in one apparatus. Both low-boiling boron compounds and high-boiling boron compounds are removed in the apparatus. Positioning the adsorber in the feed to the column is not advisable since the content of boron compounds at this point is still very high which would lead to very rapid loading of the adsorber. To achieve the same effect of the adsorber in a conventional dividing wall column would require providing said column with corresponding internals.

It is known to employ catalytically active internals in dividing wall columns. EP1513791 B1 discloses a distillation column having at least two vertical distillation segments, wherein at least one of the segments comprises catalyst and at least one of the segments is free of catalyst, wherein the segments are divided by a wall extending along a vertical portion of the distillation column, wherein the vertical portion comprises less than the total height of the column and the segments are in fluid communication around a vertical terminus/end of the wall.

A similar concept would in principle also be conceivable for the use of adsorbers in a dividing wall column. However, since the adsorbers need to be replaced at regular intervals (loading, conditioning) this version is disadvantageous. Since the distillation is a continuous process, relatively long interruptions in operation due to regularly required replacement of the internals are not desired.

The object to be achieved by the invention arose from the problems described above.

SUMMARY OF THE INVENTION

The invention is directed to a process for distillative separation of a multicomponent mixture, comprising
a low boiler comprising dichlorosilane and at least one boron-, phosphorus- or arsenic-containing impurity,
a middle boiler comprising trichlorosilane and at least one boron-, phosphorus- or arsenic-containing impurity,
and a high boiler comprising silicon tetrachloride,
wherein the multicomponent mixture is supplied to a first distillation column to remove the at least one high boiler comprising silicon tetrachloride as a bottoms fraction and a tops fraction comprising dichlorosilane, trichlorosilane and at least one boron-, phosphorus- or arsenic-containing impurity is supplied to a second distillation column, wherein in the second distillation column the at least one middle boiler comprising trichlorosilane is removed via a side draw and the at least one low boiler comprising dichlorosilane is removed as tops fraction, wherein at least one bottom draw from the second distillation column is passed through an adsorber for removing the at least one boron-, phosphorus- or arsenic-containing impurity and subsequently returned to the first distillation column as reflux, wherein both distillation columns comprise vertical dividing walls.

DETAILED DESCRIPTION OF THE PREFERRED EMBODIMENTS

When two bottom draws from the second distillation column are present one of the liquid streams or both liquid streams may be passed through the adsorber and then supplied to the first distillation column as reflux.

Instead of an adsorber in the liquid streams between the first and the second distillation column the adsorber may also be placed in the product vapor streams passing from the first to the second distillation column. The tops fraction from the first distillation column is preferably supplied to the stripping section of the second distillation column via two vapor streams. It may be provided that only one of the vapor streams is passed through the absorber before being supplied to the second distillation column. It is preferable for both vapor streams to be passed through the adsorber.

In one embodiment two adsorbers are present, wherein one or two vapor streams are passed between the first and the second distillation column through a first adsorber and one or two liquid streams are passed from the second distillation column into the reflux of the first distillation column through a second adsorber. It is particularly preferable when all liquid streams and all vapor streams are passed between the two distillation columns through an adsorber in each case.

The object is further achieved by an apparatus for distillative separation of a multicomponent mixture comprising two distillation columns materially coupled to one another by vapors from a first distillation column being in communicative connection with the bottom of a second distillation column and bottom draws of the second distillation column being in communicative connection with a reflux section of the first distillation column, wherein an adsorber for removing boron-, phosphorus- or arsenic-containing impurities is disposed in the communicative connection between the bottom draws of the second distillation column and the reflux section of the first distillation column, wherein both distillation columns comprise vertical dividing walls, wherein the third column comprises one or more side draws below the top draw and above the bottom draw.

It is preferable when both communicative connections between the first and the second distillation column each have disposed in them an adsorber for removing boron-, phosphorus- or arsenic-containing impurities.

The invention provides for materially coupling distillation columns to one another. In addition there are vertical dividing walls disposed in each of the distillation columns and the dividing walls are defined such that liquid and vapors cannot mix. Thus the dividing wall of the first distillation column extends as far as the upper end of the distillation column and the dividing wall of the second distillation column extends as far as the lower end of the distillation column.

The dividing wall disposed in the column longitudinal direction in the first distillation column divides the column interior into a feed section, a withdrawal section and a lower common column section (stripping section) and the regions of the distillation column are therefore in fluid communication with one another via the bottom section.

The dividing wall disposed in the column longitudinal direction in the second distillation column divides the column interior into a feed section, a withdrawal section and an upper common column section (rectifying section) and the regions of the distillation column are therefore in fluid communication with one another via the top section.

The material coupling of the two distillation columns achieves an addition of the theoretical plates for the two distillation columns. Thus if two identically constructed distillation columns are employed the number of theoretical plates is doubled.

The material coupling is accomplished by each of the distillation columns having at least two connections with the respective other column at spatially separate locations. Two such materially coupled distillation columns are equivalent to a single dividing wall column in terms of energy requirements. Large energy savings can thus be realized while lower capital costs are incurred compared to the new acquisition of a conventional single dividing wall column since conventional pre-existing distillation columns may be converted into dividing wall columns in the context of a revamp and interconnected with one another such that these two cited distillation columns provided with dividing walls perform the function of a prior art dividing wall column.

The materially coupled distillation columns may each be equipped with a dedicated evaporator for evaporating liquid bottoms streams and/or a condenser for condensing vaporous streams. The distillation columns preferably comprise one or more evaporator systems employing steam or thermal oils having different pressure and temperature ratings as operating media. The distillation columns preferably comprise one or more condensing systems employing cooling water or cooling brine having different pressure and temperature ratings as operating media.

It is preferable when tops stream components not condensable in a first condensation step are supplied to a further condensation step and/or a scrubber system.

The two distillation columns are preferably operated at an offgas pressure of from −1 to +10 bar and a boiling temperature range of from −20° C. to +200° C.

The low boiler fraction and the high boiler fraction may be withdrawn from different distillation columns. The operating pressures of the distillation columns are set such that the prescribed flow direction is adhered to. It is also possible to partially or completely evaporate the bottoms stream from the first distillation column in an evaporator and subsequently pass said stream to the second distillation column in biphasic form or in the form of a gaseous stream and a liquid stream.

This implementation makes it possible to easily employ adsorbers in the connecting streams between the two distillation columns. Suitable locations for placement of the adsorbers are both the product vapor stream between the two distillation columns and the liquid stream between the two distillation columns. The implementation of the dividing wall column with two coupled distillation columns makes it possible to easily integrate adsorbers. These may be replaced/conditioned at desired intervals. The adsorbers may further be employed in duplicate so as to avoid any restrictions for the operating mode of the dividing wall column. There are thus no dividing wall column downtime periods due to replacement of the adsorbers.

The object of the invention is further achieved by a process for distillative separation of a multicomponent mixture comprising
a low boiler comprising dichlorosilane and at least one boron-, phosphorus- or arsenic-containing impurity,
a middle boiler comprising trichlorosilane and at least one boron-, phosphorus- or arsenic-containing impurity,
and a high boiler comprising silicon tetrachloride,
wherein said process comprises supplying the multicomponent mixture to a first distillation column which is materially coupled to a second distillation column, wherein the second distillation column comprises a horizontal dividing wall which separates the stripping section and the rectifying section of the second distillation column, wherein the second distillation column is materially coupled to a third distillation column, removing a bottoms fraction comprising silicon tetrachloride and a tops fraction comprising dichlorosilane from the second distillation column, removing trichlorosilane via a side draw of the third distillation column, wherein an adsorber for removing the at least one boron-, phosphorus- or arsenic-containing impurity is disposed in the connections for material coupling of the second distillation column and the third distillation column, and passing the material streams through said adsorber.

It is preferable when an adsorber for removing the at least one boron-, phosphorus- or arsenic-containing impurity is disposed in each of the two connections for material coupling of the second distillation column and the first and third distillation columns, wherein the material streams are passed through said adsorbers.

In the context of the invention material coupling is to be understood as meaning that in each case appropriate feed and return lines are present between the distillation columns.

Three distillation columns, of which one distillation column comprises a horizontal dividing wall dividing the stripping section and the rectifying section of the distillation column, are materially coupled such that the two distillation columns without a dividing wall can effectively be regarded as the left-hand section and the right-hand section of a dividing wall column.

The multicomponent mixture is supplied to a first distillation column which can be regarded as the left-hand section of a dividing wall column.

The vapors from the first distillation column are passed into the second distillation column in which the stripping section is separated from the rectifying section by a horizontal dividing wall, for example a dividing plate.

In this second distillation column the tops product comprising at least one low boiler and the bottoms product comprising at least one high boiler are removed.

In a third distillation column which can be regarded as the right-hand section of a dividing wall column the target product comprising at least one middle boiler is discharged via a side draw.

The distillation columns are preferably operated at an offgas pressure of from −1 to +10 bar and a boiling temperature range of from −20° C. to +200° C.

It is preferable when at least the second distillation column comprises one or more evaporator systems for evaporating liquid bottoms streams which use steam or thermal oils having different pressure and temperature ratings as operating medium.

It is preferable when at least the second distillation column comprises one or more condensing systems for condensing vaporous streams which use cooling water or cooling brine having different pressure and temperature ratings as operating medium.

It is preferable when tops stream components not condensable in a first condensation step are supplied to a further condensation step and/or a scrubber system.

The first and the third distillation column preferably comprise 1-200 theoretical plates.

The object is further achieved by an apparatus for distillative separation of a multicomponent mixture, comprising three distillation columns materially coupled to one another by vapors from a first distillation column being in communicative connection with the rectifying section of a second distillation column and the rectifying section of the second distillation column being in communicative connection with the vapors from a third distillation column and bottom draws of the first distillation column being in communicative connection with the stripping section of the second distillation column and the stripping section of the second distillation column being in communicative connection with the bottom of the third distillation column, wherein the second distillation column comprises a horizontal dividing wall, wherein the third distillation column comprises one or more side draws below the top draw and above the bottom draw, wherein disposed in the connection for material coupling of the second distillation column and the third distillation column is an adsorber for removing boron-, phosphorus- or arsenic-containing impurities through which the respective material streams are passed.

It is preferable when both connections for material coupling of the second distillation column and the first and third distillation column each have disposed in them an adsorber for removing boron-, phosphorus- or arsenic-containing impurities through which the respective material streams are passed.

In the context of the present invention in communicative connection is to be understood as meaning that in each case appropriate feed and return lines are present between the distillation columns.

The invention thus relates to an apparatus setup where an additional distillation column is connected to two existing distillation columns in order thus to achieve thermal and material coupling.

It is preferable when inside the second distillation column the rectifying section is separated from the stripping section by a horizontal impermeable plate.

In terms of the mode of operation the invention is comparable with the principle of a dividing wall column though it differs in terms of apparatus implementation, especially since no vertical dividing plates are necessary in the distillation columns due to the use of an interposed distillation column having a horizontal dividing plate.

The material coupling of two distillation columns is accomplished by each of the distillation columns having at least two connections with another distillation column at spatially separate locations.

In terms of energy requirements such a column configuration is equivalent to a single dividing wall column having an identical number of plates.

Large energy savings can thus be realized yet lower capital costs are incurred compared to the new acquisition of a conventional single dividing wall column since existing distillation columns can be used and only one additional distillation column, which has considerably smaller dimensions than a new dividing wall column, need be procured. The reason for this is that the stripping section and the rectifying section of a dividing wall column generally have fewer plates.

Furthermore the two distillation columns that, in this configuration, are intended to correspond to the dividing wall sections retain the full diameter in this configuration. This markedly increases the capacity of the plant compared to a dividing wall column which has a diameter merely equal to the diameter of one of the two individual columns.

In most cases the capital costs for this configuration will therefore be lower than new investment in an equivalent dividing wall column having the same separation performance and capacity. This makes the invention attractive for revamps where, simultaneously, the capacity of the plant is to be increased but the specific energy requirements are to be reduced.

The low boiler fraction and the high boiler fraction are withdrawn from the distillation column having a horizontal dividing wall.

The second distillation column having a horizontal dividing wall is preferably provided with a dedicated evaporator and a condenser. The operating pressures of the distillation columns are preferably adjusted such that the prescribed direction of flow is maintained.

It is preferable when an adsorber is installed in the liquid stream passing from the rectifying section of the second distillation column having a horizontal dividing wall to the third distillation column. It is particularly preferable when an adsorber is installed in each of the liquid streams passing from the rectifying section of the second distillation column having a horizontal dividing wall into the first and third distillation columns.

It is preferable when there is an adsorber disposed in each of the liquid streams passing from the first and third distillation columns into the stripping section of the second distillation column having a horizontal dividing wall.

One embodiment employs two adsorbers and all liquid streams between the first distillation column and the second distillation column having a horizontal dividing wall are passed through a first adsorber and all liquid streams between the third distillation column and the second distillation column having a horizontal dividing wall are passed through a second adsorber.

The realization of the concept of the dividing wall column having the apparatuses outlined herein has the effect that here too there are no restrictions on the use of adsorbers for removing boron components.

The concept outlined herein permits continuous operation of the plant even when the adsorber material needs to be replaced or conditioned. The adsorbers are preferably employed at least in duplicate and replacement therefore does not result in plant downtime.

The separation of the liquid streams and product vapor streams on account of the dividing wall column mode of operation affords additional degrees of freedom for the operation of the adsorbers that do not exist in the classical setup. This is advantageous for the removal of boron-containing compounds from chlorosilane-containing product streams.

Preferred implementation versions of the invention and the differences between said versions and the prior art are elucidated hereinbelow with reference to figures.

The features cited in connection with the abovedescribed embodiments of the process according to the invention may each be applied to the corresponding apparatus according to the invention. Conversely, the features cited in connection with the abovedescribed embodiments of the apparatus according to the invention may each be applied to the corresponding process according to the invention. These and other features of the embodiments according to the invention are elucidated in the description of the figures and in the claims. The individual features may in each case be realized either separately or in combination as embodiments of the invention. Said features may further describe advantageous implementations eligible for protection in their own right.

Figure 1:
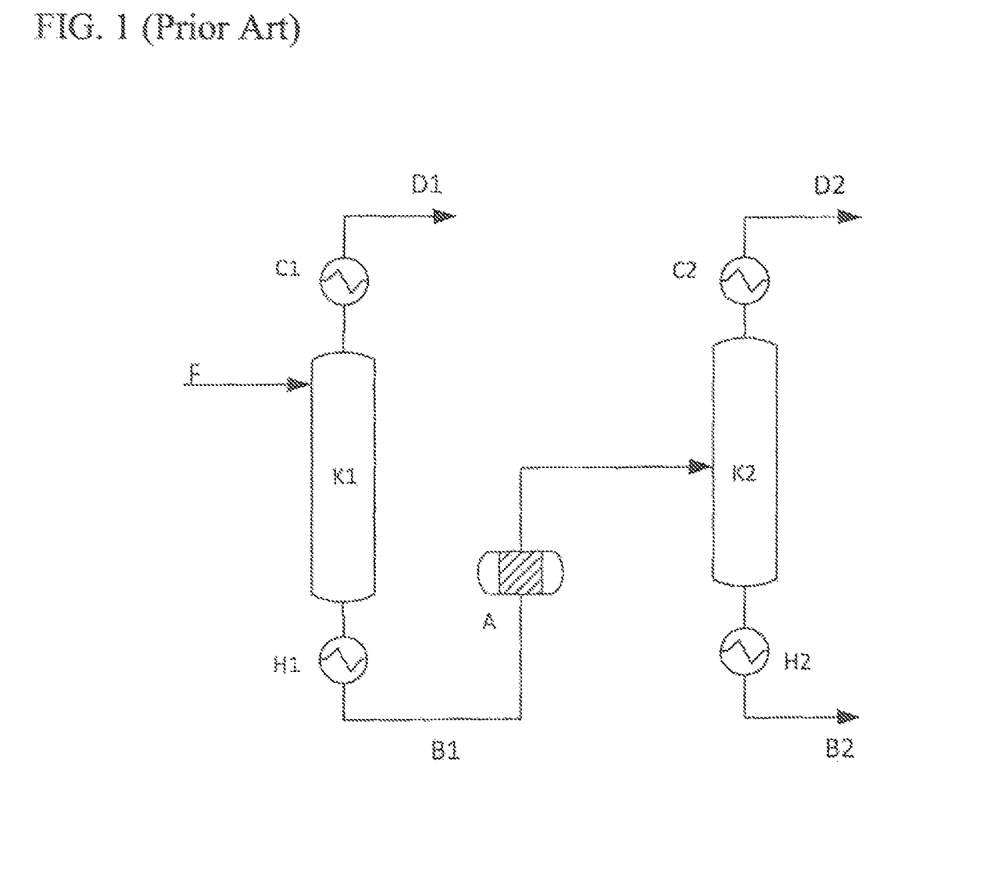
FIG. 1 illustrates a prior art configuration employing a plurality of distillation columns with an adsorber.

FIG. 1 shows a first column K1 which is provided with a condenser C1 and an evaporator H1 and primarily removes low boiling components via the material stream D1. The liquid material stream B1 passes into the adsorber A. A gaseous material stream B2 may optionally be fed into the adsorber via a side draw. In the adsorber A boron-containing components are adsorbed or converted as desired. In the second column K2 provided with a condenser C2 and an evaporator H2 predominantly high-boiling components are removed via the material stream B3. The product D2 may be obtained overhead and either passes through further distillation steps or may be directly deposited to form polycrystalline silicon.

Figure 2:
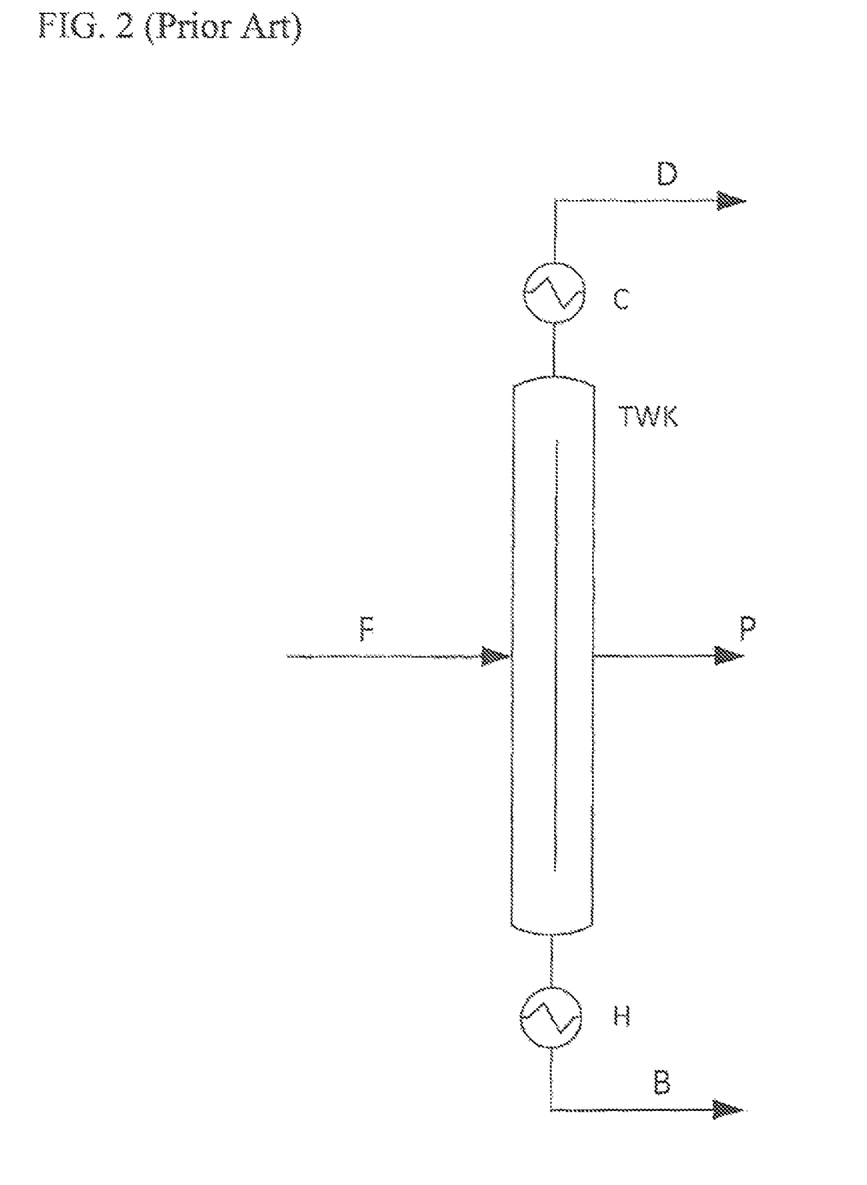
FIG. 2 shows a prior art dividing wall column without an adsorber.

In the arrangement in FIG. 2 the feed stream F passes into the column TWK which has an evaporator H and a condenser C. Predominantly volatile compounds are removed via the material stream D. The material stream B comprises predominantly high-boiling compounds. The product P may be obtained via a side draw and either passes through further distillation steps or may be directly deposited to form polycrystalline silicon.

Figure 3:
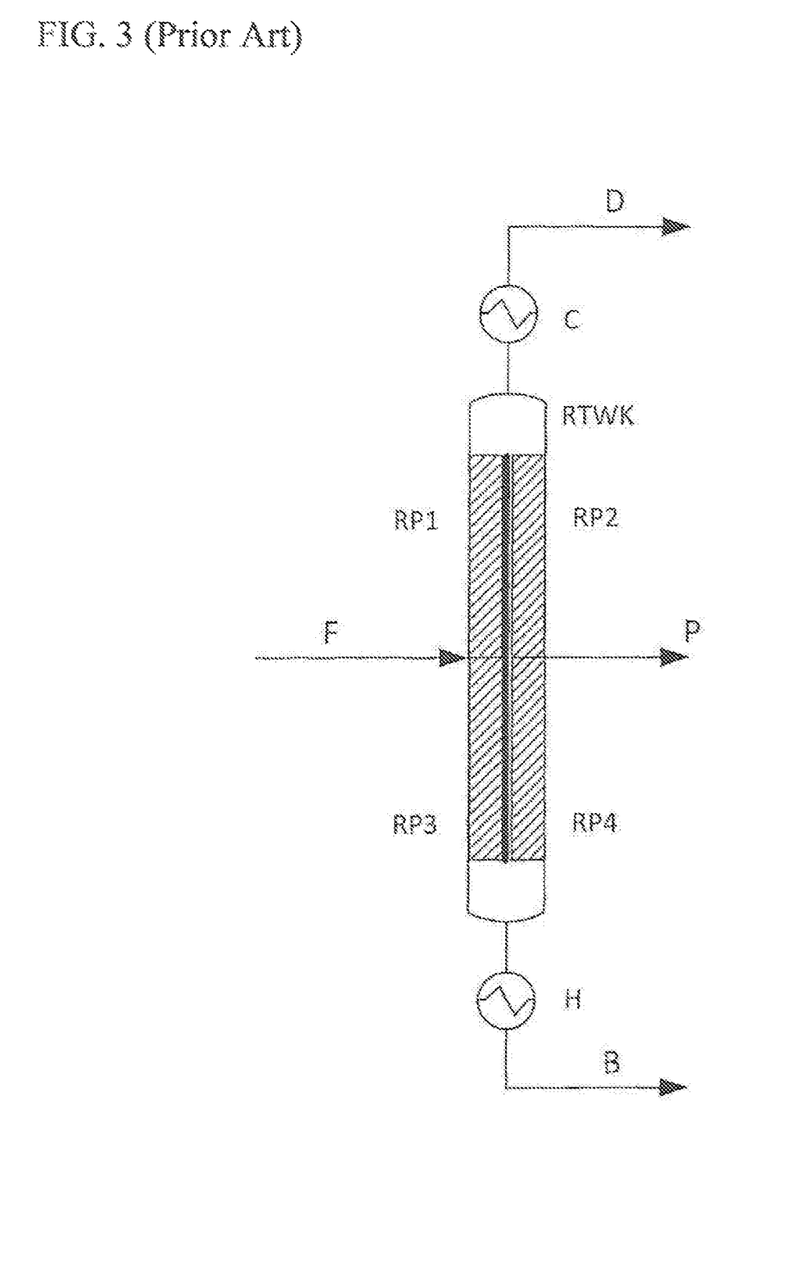
FIG. 3 shows a prior art reactive dividing wall column without an adsorber.

In the arrangement in FIG. 3 the feed stream F passes into the column RTWK which has an evaporator H and a condenser C. Predominantly volatile compounds are removed via the material stream D. The material stream B comprises predominantly high-boiling compounds. The product P may be obtained via a side draw and either passes through further distillation steps or may be directly deposited to form polycrystalline silicon. The internals RP1-4 are coated with adsorber material and boron-containing components are therefore adsorbed or converted as desired at the surfaces of said internals.

Figure 4:
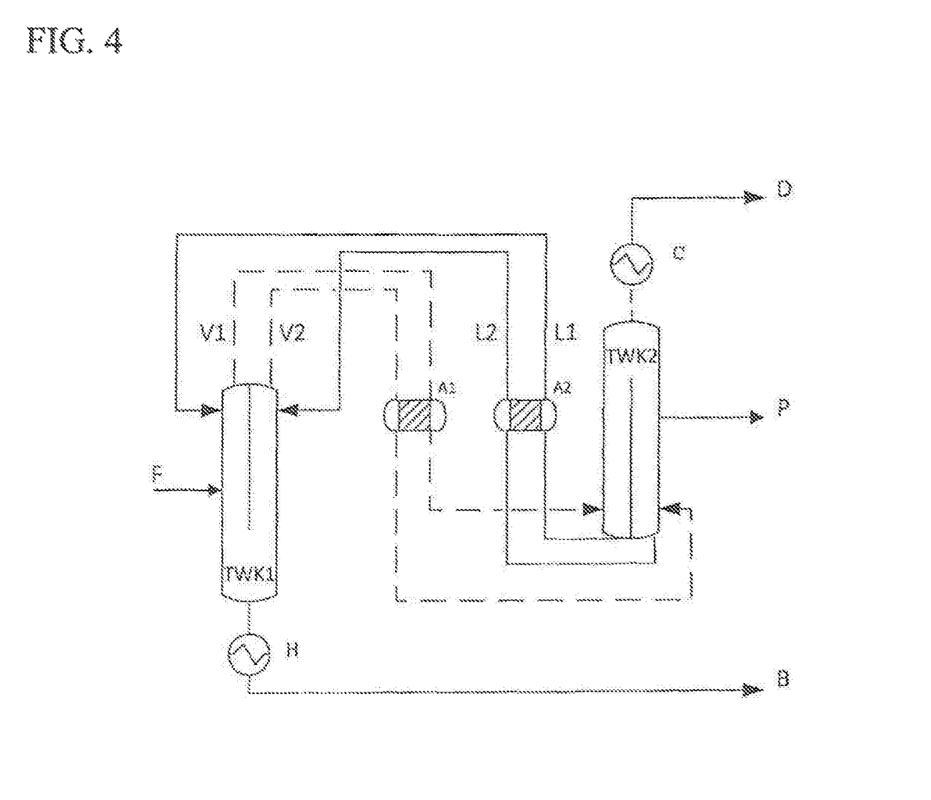
FIG. 4 shows a dividing wall column formed by coupling two existing dividing wall columns with adsorbers in accordance with one embodiment of the invention.

FIG. 4. shows that the feed stream F passes into the first column TWK1 provided with an evaporator H and a dividing wall. In this column predominantly high-boiling compounds are removed via the bottoms product stream B. The vapor streams V1 and V2 from TWK1 may now be passed through the adsorber A1 outside the column. It is possible to pass either both streams or else only one of the two streams at a time through the adsorber A1. Downstream of the adsorbers the vapor streams are introduced into the dividing wall column TWK2. The column TWK2 has a condenser C and a dividing wall. Predominantly low-boiling compounds are removed via the material stream D. The target product is removed via a side draw in the material stream P which either passes through further distillation steps or may be directly deposited to form polycrystalline silicon. The two liquid material streams L1 and L2 which exit TWK2 in the bottoms pass into the adsorber A2. It is possible to pass either both streams or else only one of the two streams at a time through the adsorber A2. Downstream of the adsorber both material streams are introduced into the column TWK1 as reflux.

Figure 5:
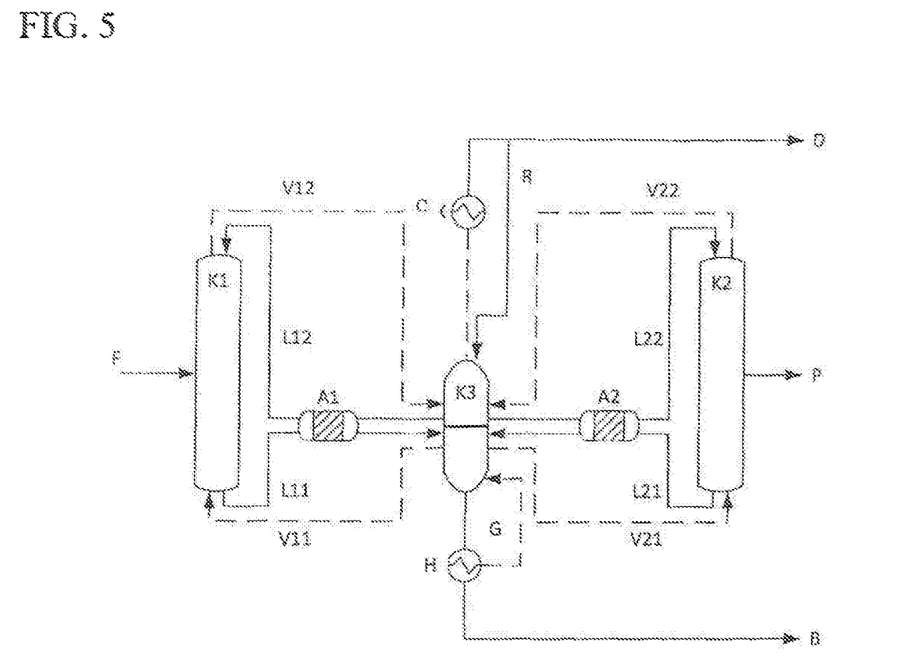
FIG. 5 shows a column configuration composed of three distillation columns for fractionating a three-component mixture with adsorbers in accordance with further embodiment of the invention.

According to FIG. 5 the feed stream F passes into the first column K1. The bottom draw stream L11 from K1 is fed through the adsorber A1. Downstream of the adsorber A1 the material stream L11 passes into the column K3 provided with an evaporator H, a condenser C and a horizontal dividing wall that separates the stripping section and the rectifying section from one another. The material stream L11 is introduced into the stripping section of the column K3 where it serves as reflux stream. The bottom draw stream L21 from the column K2 is fed through the adsorber A2. Downstream of the adsorber A2 the material stream L21 is likewise introduced into the stripping section of the column K3 where it serves as reflux stream. In the stripping section of the column K3 predominantly high-boiling compounds are removed via the bottoms product stream B. The vapor streams V11 and V21 which separate out from the vapor stream G are supplied to the two columns K1 and K2. At the top of the two columns K1 and K2 the vapor streams V12 and V22 are withdrawn and supplied to the rectifying section of the column K3. The vapor stream exiting K3 is condensed and predominantly low-boiling compounds are removed via a substream D. The reflux R is passed into the rectifying section of K3 and fed through the adsorbers A1 and A2 in a particular ratio in the form of the liquid streams L12 and L22. Downstream of the adsorbers these material streams are supplied to the two columns K1 and K2. In column K2 the material stream P is removed via a side draw and either passes through further distillation steps or may be directly deposited to form polycrystalline silicon.

EXAMPLES AND COMPARATIVE EXAMPLE

In the Comparative Example and in Examples 1 and 2, the material stream F is composed of a chlorosilane-containing mixture comprising a low boiler fraction, composed of MCS and DCS (mono- and dichlorosilane), and I1 where I1 represents low-boiling trace components comprising boron, phosphorus and arsenic, for example $BCl_3$, $PH_3$ or $AsH_3$. The boiling points of these components are below 32° C. under standard conditions.

This stream further comprises a middle boiler fraction composed of TCS (trichlorosilane) and I2 where I2 represents middle-boiling trace components comprising boron, phosphorus and arsenic, for example $B_2Cl_4$. The boiling points of these components are in the region of 32° C. under standard conditions.

This stream further comprises a high boiler fraction composed of STC (tetrachlorosilane), high boilers, where high boilers represent di- and oligosilanes, and I3, where I3 represents high-boiling trace components comprising boron, phosphorus and arsenic, for example B-O compounds. The boiling points of these components are above 32° C. under standard conditions.

Comparative Example—Classical Setup

FIG. 1 shows a classical distillation arrangement composed of a stripping column K1 including an evaporator H1 and a condenser C1 and of a rectifying column K2 including an evaporator H2 and a condenser C2. The adsorber A is disposed between the two columns.

In the column K1 the low boiler fraction is removed via the material stream D1. The material stream B1/B2 is fed through the adsorber A. In the adsorber impurities present in trace amounts comprising boron, phosphorus and arsenic are adsorbed and partially hydrolyzed. In the second column K2 the high boiler fraction is withdrawn via the material stream B3 and the target product (middle boiler fraction) is withdrawn via the material stream D2.

Table 1 shows the mass fractions of the individual components in the respective substreams according to the Comparative Example.

TABLE 1

| component | material stream | | | | |
|---|---|---|---|---|---|
| | F | D1 | B1 | D2 | B2 |
| TCS | 98.960% | 90.000% | 99.999% | 99.999% | 99.999% |
| DCS | 1% | 10% | — | — | — |
| I1 | 3000 ppbw | 30 ppmw | 900 ppta | — | — |
| I2 | 1000 ppta | — | 1100 ppta | 1200 ppta | — |
| I3 | 100.0 ppba | — | 110 ppba | — | 10 ppba |
| STC | 100 ppmw | — | 110 ppmw | — | 1500 ppmw |
| high boilers | 200 ppmw | — | 220 ppmw | — | 3000 ppmw |

The target product stream D2 comprises predominantly TCS and the middle-boiling impurities I2.

Example 1—Dividing Wall Column with Adsorber

FIG. 4 shows the preferred embodiment of a dividing wall column according to the invention with an adsorber comprising a first distillation column TWK1 implemented as a dividing wall column and including an evaporator H and a second distillation column TWK2 likewise implemented as a dividing wall column and including a condenser C. The adsorbers A1 and A2 are disposed between the two columns.

In the column TWK1 the high boiler fraction is removed via the material stream B. In the second column TWK2 the low boiler fraction is withdrawn via the material stream D and the target product (middle boiler fraction) is withdrawn via the material stream P. The liquid streams L1 and L2 and the product vapor streams V1 and V2 may each be fed through the adsorbers A1 and A2 to remove from these material streams/to hydrolyze impurities present in trace amounts comprising boron, phosphorus and arsenic. The implementation according to the invention has the effect that for the mode of operation employing both adsorbers A1 and A2, double the adsorber capacity is available.

Table 2 shows the mass fractions of the individual components in the respective substreams according to Example 1 for the case where only adsorber A2 is in operation.

TABLE 2

| component | material stream | | | |
|---|---|---|---|---|
| | F | D | B | P |
| TCS | 98.960% | 85% | 99.999% | 99.999% |
| DCS | 1% | 15% | — | — |
| I1 | 3000 ppbw | 45 ppmw | — | — |
| I2 | 1000 ppta | — | 4 ppba | 1200 ppta |
| I3 | 100 ppba | — | 2000 ppba | — |
| STC | 100 ppmw | — | 2000 ppmw | — |
| HB | 200 ppmw | — | 4000 ppmw | — |

The target product stream P predominantly comprises TCS and the middle-boiling impurities I2. The fraction of these compounds is lower in Example 1 than in the Comparative Example. Greater concentration of the trace components takes place in the two secondary streams. The amount of byproduct generated undergoes a reduction and depletion of the impurities takes place to a greater extent.

Table 3 shows the mass fractions of the individual components in the respective substreams according to Example 1 for the case where adsorbers A1 and A2 are in operation.

TABLE 3

| component | material stream | | | |
|---|---|---|---|---|
| | F | D | B | P |
| TCS | 98.960% | 85% | 99.999% | 99.999% |
| DCS | 1% | 15% | — | — |
| I1 | 3000 ppbw | 45 ppmw | — | — |

TABLE 3-continued

| component | material stream | | | |
|---|---|---|---|---|
| | F | D | B | P |
| I2 | 1000 ppta | — | 19 ppba | 20 ppta |
| I3 | 100 ppba | — | 2000 ppba | — |
| STC | 100 ppmw | — | 2000 ppmw | — |
| HB | 200 ppmw | — | 4000 ppmw | — |

The target product stream P predominantly comprises TCS and the middle-boiling impurities I2. The fraction of these compounds is even lower for the mode of operation with both adsorbers A1 and A2 than for the mode of operation with only one adsorber.

The fraction of middle-boiling impurities in the byproduct stream B is likewise higher.

Example 2—Column Configuration with Adsorber

FIG. 5 shows the preferred embodiment of an inventive column configuration with adsorbers comprising a first distillation column K1, a second column K2 and a third column K3 including evaporator H and condenser C. The adsorbers A1 and A2 are disposed between the columns K1 and K3 and between the columns K2 and K3.

The material stream is introduced into the column K1. In the stripping section of the column K3 the high boiler fraction is removed via the material stream B. In the rectifying section of the column K3 the low boiler fraction is removed via the material stream D. The liquid streams L11, L12, L21 and L22 may each be fed through the adsorbers A1 and A2 to remove from these material streams/ to hydrolyze impurities present in trace amounts comprising boron, phosphorus and arsenic.

Table 4 shows the mass fractions of the individual components in the respective substreams according to Example 1 for the case where only adsorber A2 is in operation.

TABLE 4

| component | material stream | | | |
|---|---|---|---|---|
| | F | D | B | P |
| TCS | 98.960% | 85% | 99.999% | 99.999% |
| DCS | 1% | 15% | — | — |
| A | 3000 ppbw | 45 ppmw | — | — |
| B | 1000 ppta | — | 4 ppba | 1200 ppta |
| C | 100.0 ppba | — | 2000 ppba | — |
| STC | 100 ppmw | — | 2000 ppmw | — |
| HB | 200 ppmw | — | 4000 ppmw | — |

The target product stream P predominantly comprises TCS and the middle-boiling impurities B. The fraction of these compounds is lower in Example 2 than in the Comparative Example. Greater concentration of the trace components takes place in the two secondary streams. The amount of byproduct generated undergoes a reduction and depletion of the impurities takes place to a greater extent. Table 5 shows the mass fractions of the individual components in the respective substreams according to Example 2 for the case where adsorbers A1 and A2 are in operation.

TABLE 5

| component | material stream | | | |
|---|---|---|---|---|
| | F | D | B | P |
| TCS | 98.960% | 85% | 99.999% | 99.999% |
| DCS | 1% | 15% | — | — |
| A | 3000 ppbw | 45 ppmw | — | — |
| B | 1000 ppta | — | 19 ppba | 20 ppta |
| C | 100.0 ppba | — | 2000 ppba | — |
| STC | 100 ppmw | — | 2000 ppmw | — |
| HB | 200 ppmw | — | 4000 ppmw | — |

The target product stream P predominantly comprises TCS and the middle-boiling impurities B. The fraction of these compounds is even lower for the mode of operation with both adsorbers A1 and A2 than for the mode of operation with only one adsorber. The fraction of the middle-boiling impurities in the byproduct stream B is likewise higher.

It can thus be noted that the two versions of the inventive implementations according to Example 1 and Example 2 have two advantages compared to the Comparative Example.

The specific energy input for the same separation task is about 50% lower for the two versions according to Example 1 and Example 2 than in the Comparative Example.

In process engineering terms the two examples are equivalent and they merely represent a different embodiment in terms of apparatus.

In addition to the energy saving, removal of the middle-boiling impurities B is more effective in the two versions according to Example 1 and Example 2 than in the Comparative Example.

Only about 20 ppta of component B remain in the target product streams P while the comparable product D2 of the Comparative Example comprises 1200 ppta.

Since Example 1 and Example 2 are equivalent in terms of process engineering the two versions are likewise identical with regard to removal of impurities present in trace amounts. The reason for the more effective removal of component B by the two implementations according to the invention is the option of two-fold adsorber utilization both in the gas phase and in the liquid phase. Along with the reduced energy requirements a markedly more effective removal of component I2 can be achieved.

The description of illustrative embodiments hereinabove is to be understood as being exemplary. The disclosure made thereby enables a person skilled in the art to understand the present invention and the advantages associated therewith and also encompasses alterations and modifications to the described structures and processes obvious to a person skilled in the art. All such alterations and modifications and also equivalents shall therefore be covered by the scope of protection of the claims.

What is claimed is:

1. An apparatus for a distillative separation of a multi-component mixture of chlorosilanes and boron, arsenic, and/or phosphorus impurities, comprising two distillation columns materially coupled to one another by vapors from a first distillation column being in communication via a first communicative connection with a bottom of a second distillation column, and a bottom draws of the second distillation column being in communication via a second communicative connection with a reflux section of the first distillation column, wherein an adsorber for removing boron-, phosphorus- and/or arsenic-containing impurities is disposed in the first communicative connection between the first distillation column and a bottom of the second distillation column and/or an adsorber for removing boron-, phosphorus- and/or arsenic-containing impurities is disposed in the second communicative connection between the bottom of the second distillation column and the reflux section of the first distillation column, wherein both distillation columns comprise vertical dividing walls, and wherein the second distillation column comprises one or more side draws below a top draw and above the bottom draws.

2. The apparatus of claim 1, wherein the first and second communicative connections between the first and the second distillation column each have disposed in them an adsorber for removing boron-, phosphorus- and/or arsenic-containing impurities.

3. An apparatus for a distillative separation of a multicomponent mixture comprising chlorosilanes and at least one boron, phosphorus, or arsenic impurity, comprising three distillation columns materially coupled to one another, by vapors from a first distillation column being in communication via a first communicative connection for material coupling with a rectifying section of a second distillation column, the rectifying section of the second distillation column being in communication via a second communicative connection for material coupling with vapors from a third distillation column, a bottom draw of the first distillation column being in communication via a third communicative connection for material coupling with a stripping section of the second distillation column, the stripping section of the second distillation column being in communication via a fourth communicative connection for material coupling with a bottom of the third distillation column, wherein the second distillation column comprises a horizontal dividing wall, the third distillation column comprises one or more side draws below a top draw and above a bottom draws, and disposed in the third and/or fourth communicative connections for material coupling of the second distillation column and the third distillation column is an adsorber for removing boron-, phosphorus- or arsenic-containing impurities.

4. The apparatus of claim 3, wherein all the communicative connections for material coupling each have disposed in them an adsorber for removing boron-, phosphorus- or arsenic-containing impurities through which the respective material streams are passed.

* * * * *